United States Patent
Oki et al.

(10) Patent No.: US 8,575,228 B2
(45) Date of Patent: Nov. 5, 2013

(54) ANISOTROPIC LIQUID SURFACE FORMING AGENT AND ANISOTROPIC LIQUID SURFACE FORMING METHOD

(75) Inventors: Kazuhiro Oki, Kanagawa (JP); Michitaka Matsuumi, Kanagawa (JP); Mitsuyoshi Ichihashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/487,947

(22) Filed: Jun. 4, 2012

(65) Prior Publication Data

US 2012/0245247 A1    Sep. 27, 2012

Related U.S. Application Data (62) Division of application No. 12/453,540, filed on May 14, 2009, now abandoned.

(30) Foreign Application Priority Data

May 16, 2008 (JP) ................................ 2008-129956

(51) Int. Cl.
    *B01F 3/04*    (2006.01)
(52) U.S. Cl.
    USPC ................. 522/173; 250/492.1; 252/182.31; 427/541; 427/553; 524/606; 524/612

(58) Field of Classification Search
    USPC ........... 250/492.1; 252/182.31; 427/541, 553; 522/173; 524/606, 612
    See application file for complete search history.

(56) References Cited

U.S. PATENT DOCUMENTS

| | | | |
|---|---|---|---|
| 5,412,079 A | | 5/1995 | Furukawa et al. |
| 6,153,272 A | * | 11/2000 | Kim et al. ...................... 428/1.5 |
| 2007/0191814 A1 | | 8/2007 | Chen et al. |
| 2009/0086140 A1 | | 4/2009 | Yasuda et al. |
| 2009/0246401 A1 | | 10/2009 | Matsuumi |

FOREIGN PATENT DOCUMENTS

| | | | |
|---|---|---|---|
| JP | 11-160708 | * | 6/1999 |
| JP | 11-160708 A | | 6/1999 |
| JP | 2007-003999 A | | 1/2007 |

OTHER PUBLICATIONS

Kazuhiro Okia, Yuji Nagasakab, Measurements of anisotropic surface properties of liquid films of azobenzene derivatives, Colloids and Surfaces A: Physicochem. Eng. Aspects 333 (2009) 182-186, © 2008 Elsevier B.V. All rights reserved.*

* cited by examiner

*Primary Examiner* — Bijan Ahvazi
(74) *Attorney, Agent, or Firm* — Jean C. Edwards; Edwards Neils PLLC (57) ABSTRACT

An agent comprising a substituted aromatic azo compound is capable of making a liquid surface express anisotropy in a simplified manner.

9 Claims, 2 Drawing Sheets

ANISOTROPIC LIQUID SURFACE FORMING AGENT AND ANISOTROPIC LIQUID SURFACE FORMING METHOD

CROSS-REFERENCE TO RELATED APPLICATIONS

The present application is a divisional application of U.S. patent application Ser. No. 12/453,540, filed May 14, 2009, which claims priority from Japanese Patent Application No. 2008-129956, filed May 16, 2008, the contents of all of which are herein incorporated by reference in their entirety.

BACKGROUND OF THE INVENTION

1. Field of the Invention

The present invention relates to a material capable of imparting anisotropy to the thermophysical properties of the surface of a solution prepared by adding a polymer or a monomer to a solvent, which is applicable to production of optical films such as polarizers, anisotropic thermoconductive films, etc.

2. Description of the Related Art

For imparting anisotropy to a film, well employed is a photoalignment method using an azo material. For example, a method for producing a photoalignment film is disclosed (see JP-A 2005-49386), which comprises applying a photoaligning material onto a substrate and fixing it thereon with applying an anisotropic light to it. JP-A 2001-290028 discloses an example of applying the technique to optical film production.

For functional films such as optical films and the like that are required to have severe uniformity of themselves, the uniformity in coating in film formation and the uniformity in drying in the process of drying the formed film to remove the solvent through evaporation therefrom are important factors, for which, for example, employed is a method of adding a polymer that are selectively much adsorbed by the surface of a liquid film, such as a surfactant to the film-forming liquid to thereby control the physical properties of the liquid on a desired level to form a uniform film surface. For evaluating the anisotropy of a photoalignment film, for example, the change in the refractive index, the transmittance or the like of the film is optically determined.

SUMMARY OF THE INVENTION

For evaluating the anisotropy of a photoalignment film, in general, the film is, after dried, polymerized with photoalignment to thereby fix its function and then the film is analyzed, for which, for example, employable is a method of evaluating the anisotropy and the alignment of the formed film as a whole. On the other hand, in case where a photoalignment film is used as an optical film, the structure of the film formed in the process of coating and drying it is an extremely important parameter, and for making the film have a higher function, it is important to control the structure of the film. One significant factor to determine the quality of the film is the thermophysical property thereof during its production process of from coating to drying, and in particular, it is necessary to accurately control the physical properties of the surface of the film. For this, it has been considered that, when a photoaligning material is previously made to be selectively adsorbed by and localized in the surface of a liquid film and when the material thus locally existing in the vicinity of the surface thereof is photoaligned to thereby make the film have anisotropic physical properties, then a film of extremely high quality could be produced; however, heretofore no one knows such a material capable of being used with the idea. In addition, regarding the efficiency evaluation of such a material, it may be possible to totally evaluate the anisotropy of the liquid film thereof as a whole; however, no one knows a method of collecting the information data of the surface alone of the liquid film and analyzing them for the anisotropy of the surface properties of the liquid film and additionally for the optical anisotropy of the surface thereof. For these reasons, a technique of development of such a material capable of being selectively adsorbed by the surface of a liquid film and capable of making the liquid film express anisotropy even when the film is kept still liquid has been delayed. For aligning a specific material in the surface of a liquid film, known is a method of producing a single-molecular film according to a Langmuir-Blodgett's technique (Arthur W. Adamson, Alice P. Cast: Physical Chemistry of Surfaces (Wiley-Interscience, 1997), p. 557); however, the method has some problems in that only an extremely special material could be used and that the producibility thereof is too low as a method for producing optical films, etc.

Accordingly, for the purpose of solving the problems in the prior art as above, the present inventors have assiduously studied so as to develop a method capable of making a liquid surface express anisotropy in a simplified manner and to develop a material capable of being effectively used for the method, to which the present invention is directed as its objects.

The inventors have further studied so as to solve the above-mentioned problems and, as a result, have found that, when a compound having a specific structure is used, then an anisotropic liquid surface can be formed in a relatively simplified manner, and thus have completed the invention. Specifically, the invention provides the following, as a means for solving the problems.

[1] An anisotropic liquid surface-forming agent, containing a substituted aromatic azo compound.

[2] The anisotropic liquid surface-forming agent of [1], wherein the substituted aromatic azo compound is a substituted azobenzene.

[3] The anisotropic liquid surface-forming agent of [1] or [2], wherein the substituted aromatic azo compound has a polymerizable group.

[4] The anisotropic liquid surface-forming agent of [3], wherein the substituted aromatic azo compound is an aromatic azo compound substituted by a substituent having a fluorine atom.

[5] The anisotropic liquid surface-forming agent of [3] or [4], wherein the aromatic azo compound has one azo group in the molecule.

[6] The anisotropic liquid surface-forming agent of any one of [3] to [5], wherein the aromatic azo compound has two or three arylene groups in the molecule.

[7] The anisotropic liquid surface-forming agent of any one of [3] to [6], wherein the aromatic azo compound is a compound of the following formula (1):

(1)

wherein R¹ represents a hydrogen atom, a cyano group, a fluorine atom, a chlorine atom, a bromine atom, N(CH₃)₂ or a group of the following formula (2):

(2)

L¹, L², L³ and L⁴ each independently represent a single bond, —O—, —O—CO—, —O—CO—O—, —CO—O—, —S—, —NCH₃—, —NH, —N(CH₃)—CO—, —NH—CO—, —CO—N(CH₃)—, or —CO—NH—;
S¹, S², S³ and S⁴ each independently represent a single bond, or a substituted or unsubstituted alkylene group;
Q¹ and Q² each independently represent a hydrogen atom, a fluorine atom or a polymerizable group;
M¹ and M² each independently represent a linking group having any of the following structures:

R², R³ and R⁴ each independently represent a fluorine atom, a chlorine atom, a bromine atom, —CH₃, —OCH₃, or —CN;
p2, p3 and p4 each independently indicate an integer of from 0 to 4; and
m and n each independently indicate an integer of from 0 to 3.
[8] The anisotropic liquid surface-forming agent of [1], wherein the aromatic azo compound is a polymer comprising a side chain having one azo group.
[9] The anisotropic liquid surface-forming agent of [8], wherein the aromatic azo compound is a polymer comprising a side chain having two or three arylene groups.
[10] The anisotropic liquid surface-forming agent of any one of [1], [8] and [9], wherein the aromatic azo compound has a number-average molecular weight of from 2000 to 100000.
[11] The anisotropic liquid surface-forming agent of any one of [1] and [8] to [10], wherein the aromatic azo compound has a structural unit of the following formula (3):

(3)

wherein R⁵ represents a hydrogen atom or a methyl group;
L⁵ represents —O—, —NR⁷— or —S—;

R⁷ represents a hydrogen atom or a methyl group;
X represents a single bond, a linking group selected from the following group Z, or a linking group consisting of two or more linking groups selected from the following group Z; when the linking group has a hydrogen atom, the hydrogen atom may be substituted by a substituent;
Z is a group consisting of —O—, —S—, —CO—, —SO₂—, —NH—, —CH₂—, —CF₂—, —CH═CH— and —C≡C—,
L⁶ represents a single bond, —O—, —NR⁸—, —S—, —OCO₂—, —CO₂—, or —OCO—;
R⁸ represents a hydrogen atom or a methyl group;
R⁶ represents a hydrogen atom, a substituted or unsubstituted alkylene group, —CN, —NO₂, an unsubstituted or substituted alkoxy group, a fluorine atom, a chlorine atom, a bromine atom, —CF₃, —CO₂R⁹, —C═O—R¹⁰ or R⁹ represents a substituted or unsubstituted alkyl group;
R¹⁰ represents a hydrogen atom, or a substituted or unsubstituted alkyl group; and
R¹¹ represents a hydrogen atom, or a substituted or unsubstituted alkyl group.
[12] The anisotropic liquid surface-forming agent of any one of [1] to [11], which is a solution of the substituted aromatic azo compound in a solvent.
[13] The anisotropic liquid surface-forming agent of [12], wherein the solvent comprises an organic solvent having a boiling point of not higher than 200° C.
[14] A method for forming an anisotropic liquid surface, comprising:
mixing a liquid with an anisotropic liquid surface-forming agent comprising a substituted aromatic azo compound to form a mixture, and
exposing the surface of the mixture to an anisotropic light to form an anisotropic liquid surface.
[15] The method for forming an anisotropic liquid surface of [14], wherein the mixture comprises insoluble components in an amount of less than 50% by mass.
[16] The method for forming an anisotropic liquid surface of [14] or [15], wherein the surface of the mixture contains no solid at the beginning of the irradiation.
[17] The method for forming an anisotropic liquid surface of any one of [14] to [16], wherein the anisotropic light has a wavelength of from 350 to 400 nm.
[18] The method for forming an anisotropic liquid surface of any one of [14] to [17], wherein the surface of the mixture is exposed to the anisotropic light at a specific angle.
[19] A method for forming an anisotropic surface, comprising:
mixing a liquid with an anisotropic liquid surface-forming agent comprising a substituted aromatic azo compound to form a mixture,
exposing the surface of the mixture to an anisotropic light to form an anisotropic liquid surface, and
drying the anisotropic liquid surface.
[20] A method for forming an anisotropic surface, comprising:
mixing a liquid with an anisotropic liquid surface-forming agent comprising a substituted aromatic azo compound to form a mixture, exposing the surface of the mixture to an anisotropic light to form an anisotropic liquid surface, and polymerizing the anisotropic liquid surface.

When the anisotropic liquid surface-forming agent of the invention is mixed with a liquid and then exposed to an anisotropic light, then it may form an anisotropic liquid surface with ease.

BRIEF DESCRIPTION OF THE DRAWINGS

In FIGS. 2 and 3, 1 is a YAG Laser; 2 and 13 are λ/2 plates; 3, 4, 11, 12, 16 and 21 are mirrors; 8 is a polarized beam splitter; 9, 10, 14, 15 and 20 are pin holes; 17 is an FFT; 18 is an amplifier/filter; 19 is a photomultiplier; 22 is a sample; 30 and 31 are acousto-optic modulators; and 40 is a lamp.

BEST MODE FOR CARRYING OUT THE INVENTION

The anisotropic liquid surface-forming agent and the method for using it are described in detail hereinunder.

The description of the constitutive elements of the invention given hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

[Substituted Aromatic Azo Compound]
(Characteristics of Structure)

The anisotropic liquid surface-forming agent of the invention contains a substituted aromatic azo compound.

The substituted aromatic azo compound for use in the invention is a compound having at least one azo compound, at least one aromatic ring, and at least one substituent bonding to the aromatic ring. The aromatic ring may be a single ring or a polycyclic ring (fused ring), but is preferably a single ring. Preferably, the substituted aromatic azo compound for use in the invention has at least two aromatic rings; and preferably, the compound contains an azobenzene structure where the azo group is sandwiched between two aromatic rings. By suitably selecting the length of the substituent therein, the chain length of the substituted aromatic azo compound can be controlled. For example, in the substituted aromatic azo compound having an azobenzene structure, preferably, the aromatic rings that sandwich the azo group therebetween each have a substituent. The substituent may contain a polymerizable group such as an ethylenic unsaturated bond.

The substituted aromatic azo compound for use in the invention may be a polymer or may be a non-polymer low-molecular compound. In the following, the substituted aromatic azo compound for use in the invention, as grouped into a low molecular compound and a polymer, is described in detail.

(Low-Molecular Compound)

The low-molecular, substituted aromatic azo compound is especially preferably an aromatic azo compound substituted by a fluorine atom-containing substituent. Substituted by a fluorine atom-containing substituent, the substituted aromatic azo compound is advantageous in that it can readily localize in a liquid surface and that its alignability in irradiation with light is bettered. The number or the fluorine atoms to be in the low-molecular, substituted aromatic azo compound is preferably from 1 to 800, more preferably from 1 to 100, even more preferably from 1 to 50. Regarding its position, the fluorine atom may be in the chain or the side branch or may be at the terminal, but is preferably at the terminal. In case where the compound has a fluorine atom at its terminal, it may have a fluorine atom at both terminals thereof, or only at one terminal thereof. Preferred examples of the fluorine atom-containing substituent include perfluoroalkyl groups such as $CF_3$, $CF_2CF_3$, $CF_2CF_2CF_3$, $CF_2CF_2CF_2CF_3$, $CF_2CF_2CF_2CF_2CF_3$, $CF_2CF_2CF_2CF_2CF_2CF_3$; and substituted perfluoroalkyl groups where one terminal atom is substituted by a hydrogen atom, such as $CF_2H$, $CF_2CF_2H$, $CF_2CF_2CF_2H$, $CF_2CF_2CF_2CF_2H$, $CF_2CF_2CF_2CF_2CF_2H$, $CF_2CF_2CF_2CF_2CF_2CF_2H$.

The low-molecular, substituted aromatic azo compound may have plural azo groups in the molecule, but preferably has one azo group in the molecule. More preferably, the compound has an azobenzene structure where the azo group is sandwiched between two aromatic rings as in the above.

The low-molecular, substituted aromatic azo compound preferably has from 2 to 6 arylene groups in the molecule, more preferably from 2 to 4 arylene groups, even more preferably 2 or 3 arylene groups. Preferably, the arylene group is a phenylene group.

A preferable structure of the low-molecular, substituted aromatic azo compound is represented by the following formula (1):

(1)

In the formula (1), $R^1$ represents a hydrogen atom, a cyano group, a fluorine atom, a chlorine atom, a bromine atom, $N(CH_3)_2$ or a group represented by the following formula (2). $R^1$ preferably represents a hydrogen atom, a cyano group, a fluorine atom, a chlorine atom, $N(CH_3)_2$ or the group represented by the formula (2), and more preferably represents a hydrogen atom, a cyano group, a fluorine atom or the group represented by the formula (2):

(2)

$L^1$, $L^2$, $L^3$, and $L^4$ each independently represent a single bond, —O—, —O—CO—, —O—CO—O—, —CO—O—, —S—, —NCH$_3$—, —NH, —N(CH$_3$)—CO—, —NH—CO—, —CO—N(CH$_3$)— or —CO—NH—. $L^1$ and $L^3$ each independently preferably represent a single bond, —O—, —O—CO—, —O—CO—O— or —CO—O—, and even more preferably represent a single bond, —O—, —O—CO— or —O—CO—O—. $L^2$ and $L^4$ each independently preferably represent a single bond, —O—, —O—CO—, —O—CO—O— or —CO—O—, and even more preferably represent a single bond, —O—, —O—CO— or —CO—O—.

$S^1$, $S^2$, $S^3$, and $S^4$ each independently represent a single bond, or substituted or unsubstituted alkylene group. The substituted or unsubstituted alkylene group preferably has 1-12 carbon atoms. Preferable substituted alkylene groups are those where the hydrogen atom of —$CH_2$— is substituted by $CH_3$, $OCH_3$, CN, F, Cl or Br, and those where —$CH_2$— is substituted by —O— or —S— provided that neighboring —$CH_2$— are not substituted by —O— or —S— at the same time. $S^1$, $S^2$, $S^3$, or $S^4$ each independently preferably represent a single bond, an unsubstituted alkylene group having 1-10 carbon atoms, a substituted alkylene group having 1-10 carbon atoms wherein one to ten methylene groups are substituted by —$CF_2$—, or a substituted alkylene group represented by —($CH_2$—$CH_2$—O—$CH_2$—$CH_2$)—.

$Q^1$ and $Q^2$ each independently represent a hydrogen atom, a fluorine atom or a polymerizable group. As the polymerizable group, are preferable, and are more preferable.

$M^1$ and $M^2$ each independently represent a linking group having any of the following structures:

-continued $M^1$ and $M^2$ preferably represent and more preferably represent

$R^2$, $R^3$, and $R^4$ each independently represent a fluorine atom, a chlorine atom, a bromine atom, —$CH_3$, —$OCH_3$ or —CN. $R^2$, $R^3$, and $R^4$ each independently preferably represent a fluorine atom, a chlorine atom, —$CH_3$, —$OCH_3$ or —CN, more preferably represent a fluorine atom, —$CH_3$, —$OCH_3$, or —CN.

p2, p3, and p4 each independently indicate an integer of 0-4, more preferably indicate an integer of 0-2, even more preferably indicate 0 or 1.

m and n each independently indicate an integer of 0-3, preferably indicate an integer of 0-2, even more preferably indicate 0 or 1.

Examples of the substituted aromatic azo compound represented by the formula (1) are shown below. However the substituted aromatic azo compounds which can be used in the present invention are not limited to these examples.

(1-1)

(1-2)

(1-3)

(1-4)

(1-5)

(1-6)

(1-7)

(1-8)

(1-9)

(1-10)

(1-11)

(1-12)

(1-13)

(1-14)

(1-15)

(1-16)

(1-17)

(1-18)

(Polymer)

The substituted aromatic azo compound may be a polymer. The polymer may have a substituted aromatic azo structure in its side chain. The substituted aromatic azo structure may have two or more azo groups, but preferably has one azo group. More preferably, the substituted aromatic azo structure contains an azobenzene structure where the azo group is sandwiched between two aromatic rings.

The polymer of the substituted aromatic azo compound preferably has from 2 to 6 arylene groups in the substituted aromatic azo structure of the side chain thereof, more preferably from 2 to 4 arylene groups, even more preferably 2 or 3 arylene groups. Preferably, the arylene group is a phenylene group.

Preferably, the main chain of the polymer, substituted aromatic azo compound, comprises an alkylene group.

Preferably, the number-average molecular weight of the polymer, substituted aromatic azo compound, is from 2000 to 100000, more preferably from 2000 to 50000, even more preferably from 2000 to 30000.

The polymer, substituted aromatic azo compounds, preferably has a structural unit represented by the following formula (3)

(3)

In the formula (3), $R^5$ represents a hydrogen atom or a methyl group.

$L^5$ represents —O—, —NR$^7$— ($R^7$ represents a hydrogen atom or a methyl group), or —S—. $L^5$ preferably represents —O— and —NR$^7$— ($R^7$ represents a hydrogen atom or a methyl group), and more preferably represents —O—.

X represents a single bond, a linking group selected from the group Z, or a linking group consisting of two or more linking groups selected from the group Z. Z is a group consisting of —O—, —S—, —CO—, —SO$_2$—, —NH—, —CH$_2$—, —CF$_2$—, —CH=CH— and —C≡—. Here, the hydrogen atom of —NH—, —CH$_2$— and —CH=CH— may be substituted by a substituent. Preferable examples of the substituent include a fluorine atom, a chlorine atom, a bromine atom, a cyano group, a nitro group, an alkyl group having 1-6 carbon atoms, a halogen substituted alkyl group having 1-6 carbon atoms, an alkoxy group having 1-6 carbon atoms, an acyl group having 2-6 carbon atoms, an alkylthio group having 1-6 carbon atoms and an acyloxy group having 2-6 carbon atoms, and more preferable examples of the substituent include alkoxy group having 1-6 carbon atoms and an alkyl group having 1-6 carbon atoms.

The number of carbon atoms of X is preferably 0-20, more preferably 0-15, even more preferably 0-10. X more preferably represents a single bond, a linking group selected from the group consisting of —O—, —C(=O)—, —CH$_2$— and —CF$_2$—, or a linking group with 1-10 carbon atoms consisting of two or more linking groups selected from the group consisting of —O—, —C(=O)—, —CH$_2$— and —CF$_2$—. X particularly preferably represents a single bond or an alkylene group having 1-10 carbon atoms which consists of —CH$_2$— and/or —CF$_2$—. Here the alkylene group may consist of —CH$_2$— or —CF$_2$— only.

$L^6$ represents a single bond, —O—, —NR$^8$— ($R^8$ represents a hydrogen atom or a methyl group), —S—, —OCO$_2$—, —CO$_2$— or —OCO—, and preferably represents a single bond or —O—.

$R^6$ represents a hydrogen atom, a substituted or unsubstituted alkylene group, —CN, —NO$_2$, a substituted or unsubstituted alkoxy group, a fluorine atom, a chlorine atom, a bromine atom, —CF$_3$, —CO$_2$R$^9$ ($R^9$ represents a substituted or unsubstituted alkyl group), —C≡C—R$^{10}$ ($R^{10}$ represents a hydrogen atom, and a substituted or unsubstituted alkyl group), or ($R^{11}$ represents a hydrogen atom and a substituted or unsubstituted alkyl group). $R^6$ preferably represents a hydrogen atom, —CN, —NO$_2$, a substituted alkoxy group, a fluorine atom, a chlorine atom, a bromine atom, —CF$_3$, —CO$_2$R$^9$ ($R^9$ represents a substituted or unsubstituted alkyl group), —C≡C—R$^{10}$ ($R^{10}$ represents a hydrogen atom, and a substituted or unsubstituted alkyl group), or ($R^{11}$ represents a hydrogen atom and a substituted or unsubstituted alkyl group). $R^6$ more preferably represents —CN, a fluorine atom, a substituted alkoxy group. The number of carbon atoms of the substituted or unsubstituted alkylene group represented by $R^6$, the substituted or unsubstituted alkoxy group represented by $R^6$, the substituted or unsubstituted alkyl group represented by $R^9$, $R^{10}$ and $R^{11}$ is preferably 1-20, more preferably 1-15, even more preferably 1-8. The substituted or unsubstituted alkylene group represented by $R^6$, the substituted or unsubstituted alkoxy group represented by $R^6$, the substituted or unsubstituted alkyl group represented by $R^9$, $R^{10}$ and $R^{11}$ are preferably those where the hydrogen atom in —CH$_2$— is substituted by CH$_3$, OCH$_3$, CN, a fluorine atom, a chlorine atom, a bromine atom or a polymerizable group, or those where —CH$_2$— is substituted by —O— and —S— provided that neighboring —CH$_2$— are not substituted by —O— and —S—.

Examples of the polymerizable group include and preferable examples of those include and more preferable examples of those include

Examples of the structural unit represented by the formula (3) are shown below. However the structural unit which can be used in the present invention is not limited to these examples.

(4-1)

(4-2)

(4-3)

(4-4)

(4-5)

(4-6)

(4-7)

(4-8)

-continued

(4-9)

(4-10)

(4-11)

(4-12)

(4-13)

(4-14)

(4-15)

(4-16)

(4-17)

(4-18)

(4-19)

(4-20)

[Anisotropic Liquid Surface-Forming Agent]

The anisotropic liquid surface-forming agent of the invention is characterized by containing the above-mentioned, substituted aromatic azo compound. The anisotropic liquid surface-forming agent of the invention may comprise the above-mentioned, substituted aromatic azo compound alone, or may be a solution of the compound dissolved in a solvent.

In case where a solvent is used, it is preferably an organic solvent having a boiling point of not higher than 200° C., more preferably having a lower boiling point. The low-boiling-point solvent includes methyl ethyl ketone, tetrahydrofuran, etc. Two or more different types of solvents may be used herein, as combined.

Two or more different types of the substituted azo compounds may be used herein, as combined. The solution may contain any other compound than the above-mentioned, substituted aromatic azo compound, as dissolved or dispersed therein.

[Method for Forming Anisotropic Liquid Surface]

The anisotropic liquid surface-forming agent of the invention is mixed with a liquid, and the surface of the resulting mixture liquid is exposed to an anisotropic light, whereby an anisotropic surface may be formed.

In case where the anisotropic liquid surface-forming agent of the invention is solid, the solid forming agent is added to and dissolved in a liquid that is intended to form an anisotropic liquid surface. In this case, the mixture may be stirred or heated so as to fully dissolve the agent therein. In case where the anisotropic liquid surface-forming agent of the invention is liquid, it may be mixed with a liquid that is intended to form an anisotropic liquid surface. Preferably, the solvent of the anisotropic liquid surface-forming agent is the same chemical type as that of the liquid, but may be any one miscible with the liquid.

The mixture liquid of the anisotropic liquid surface-forming agent of the invention and the liquid that is intended to form an anisotropic liquid surface is preferably such that, when it is statically left as such after mixed, no solid exists in the liquid surface thereof. The total amount of the insoluble existing in the mixture liquid is preferably less than 50% by mass of the mixture liquid, more preferably less than 20% by mass, even more preferably less than 5% by mass, still more preferably less than 1% by mass.

Next, the surface of the mixture liquid is exposed to an anisotropic light to thereby form an anisotropic liquid surface.

The irradiation angle may be suitably varied depending on the use of the liquid surface to be formed. For example, the material of the invention may form a photoalignment film for liquid crystals with a controlled azimuth angle or tilt angle through irradiation with polarized or non-polarized light in oblique directions. Irradiation with polarized light in oblique directions is in such a mode that the axis of the polarization direction and the axis of the normal direction of the substrate are both on the same plane. Preferably, the irradiation with polarized light in oblique directions is at an angle of from 10 to 70 degrees relative to the normal direction of the substrate, more preferably from 20 to 60 degrees, even more preferably from 20 to 50 degrees. The light for irradiation is especially preferably near-UV light having a wavelength of from 350 nm to 400 nm. The light source includes, for example, a xenon lamp, a high-pressure mercury lamp, an ultra-high-pressure mercury lamp, a metal halide lamp, a UV laser with KrF or ArF, etc. The UV light or visible light from such a light source may be filtered through an interference filter or a color filter to restrict the wavelength range thereof for irradiation. When the light from such a light source is led to pass through a polarization filter or a polarization prism, it gives a linear polarized light. The irradiation energy may be from 10 mJ/cm$^2$ to 1000 mJ/cm$^2$, preferably from 20 mJ/cm$^2$ to 500 mJ/cm$^2$. The illumination intensity is preferably from 5 to 1000 mW/cm$^2$, more preferably from 10 to 500 mW/cm$^2$.

The anisotropy of the liquid surface may be confirmed according to the method described in Examples given hereinunder.

After the anisotropic liquid surface has been formed, it may be dried. The drying method is not specifically defined, and any ordinary method may be suitably selected and employed.

[Polymerization]

In case where the substituted aromatic azo compound of the invention has a polymerizable group, the anisotropic liquid surface formed may be polymerized while it is still a liquid film or after it is dried to be a dry film. The polymerization method includes a method of adding a polymerization initiator to the anisotropic surface-forming agent of the invention and polymerizing the formed surface, and a method of applying a solution of a polymerization initiator to the dry film formed and polymerizing it.

The polymerization initiator may be any of a radical polymerization initiator and a cationic polymerization initiator, including thermal polymerization with a thermal polymerization initiator and photopolymerization with a photopolymerization initiator. Examples of the thermal polymerization initiator for radical polymerization include azobisisobutyronitrile, etc. Examples of the photopolymerization initiator include α-carbonyl compounds (as in U.S. Pat. Nos. 2,367,661, 2,367,670), acyloin ethers (as in U.S. Pat. No. 2,448,828), α-hydrocarbon-substituted aromatic acyloin compounds (as in U.S. Pat. No. 2,722,512), polynuclear quinone compounds (as in U.S. Pat. Nos. 3,046,127, 2,951,758), combination of triarylimidazole dimer and p-aminophenyl ketone (as in U.S. Pat. No. 3,549,367), acridine and phenazine compounds (as in JP-A 60-105667, U.S. Pat. No. 4,239,850), oxadiazole compounds (as in U.S. Pat. No. 4,212,970), etc. Examples of the thermal polymerization initiator in cationic polymerization include benzylsulfonyl salt compounds. Examples of the photopolymerization initiator include organic sulfonium salts, iodonium salts, phosphonium salts, etc. The counter ion to those compounds include SbF$_6^-$, PF$_6^-$, BF$_6^-$, etc. The amount of the polymerization initiator to be added may be from 0.1 to 10% by mass of the substituted aromatic azo compound for use in the invention, more preferably from 0.1 to 8% by weight, even more preferably from 0.1 to 7% by weight. For the light irradiation for polymerization, preferably used is UV light. The irradiation energy is preferably from 10 mJ/cm$^2$ to 10 J/cm$^2$, more preferably from 50 mJ/cm$^2$ to 5 J/cm$^2$. The illumination intensity is preferably from 10 to 1000 mW/cm$^2$, more preferably from 20 to 500 mW/cm$^2$, even more preferably from 25 to 350 mW/cm$^2$. The irradiation wavelength preferably has a peak at from 250 to 450 nm, more preferably at from 300 to 410 nm. For promoting the polymerization, the light irradiation may be attained in a nitrogen atmosphere or under heat. The polymerization may also be attained in a mode of thermal polymerization in the absence of a polymerization initiator, in which the heating temperature is preferably from 50 to 240° C., more preferably from 80 to 200° C., even more preferably from 80 to 190° C.

[Use of Alignment Film]

According to the above-mentioned method, a material of which the surface is aligned may be obtained. The alignment material of the type may be widely used, for example, as a photoalignment film for VA. In particular, it is favorably used as an optical film such as a photoalignment film for VA. Specifically, when the anisotropic liquid surface-forming agent of the invention is used, then anisotropy can be efficiently expressed in a liquid surface which is still in a state of solution, and therefore an extremely high-function film can be produced according to the invention.

EXAMPLES

The characteristics of the invention are described more concretely with reference to Production Examples and Examples given below.

In the following Examples, the material used, its amount and the ratio, the details of the treatment and the treatment process may be suitably modified or changed not overstepping the scope of the invention. Accordingly, the invention should not be limitatively interpreted by the Examples mentioned below.

(Compounds Used)

As the substituted aromatic azo compounds meeting the requirements of the invention, the above-mentioned Compound (1-5) [hereinafter this is referred to as Compound 2] and the above-mentioned Compound (4-11) [hereinafter this is referred to as Compound 3] were prepared; and the following Compound 1 was prepared as a comparative compound.

Compound 1:

(Evaluation Method 1)

Figure 1:
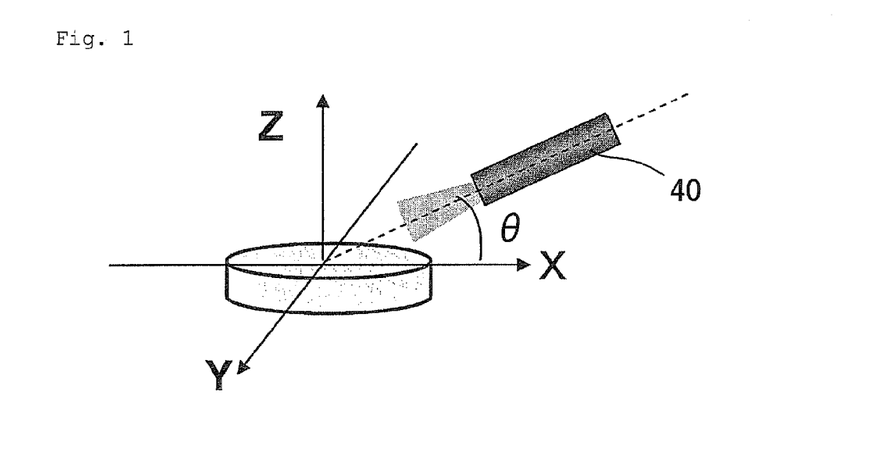
FIG. 1 is a perspective view of explaining the direction for irradiation with light.

Compound 1 was dissolved in dewatered 2-butanone (by Wako Pure Chemical Industries). Next, using an LED-assisted UV irradiator (Keyence's UV-400, φ8 mm probe, 99% output set), this 2-butanone solution of Compound 1 was exposed to UV radiation applied toward the liquid surface at an inclination of 15 degrees from the X-Y plane toward the +X axis (exposing along the +X direction), as in FIG. 1. The apparatus of FIG. 1 operates as follows: An incident light and a reference light having the same plane of polarization were used and the liquid surface was exposed to at the same exposure site but at a different incident angle, the reference light mirror-reflected from the liquid surface and the scattered light from the incident light having been scattered in the same direction as that of the reflected light are made to interfere with each other, and the resulting optical heterodyne signal is detected by the apparatus.

In the same manner as above, a 2-butanone solution of Compound 1 was prepared, and exposed to UV radiation applied toward the liquid surface at an inclination of 15 degrees from the X-Y plane toward the +Y axis (exposing along the +Y direction).

Figure 2:
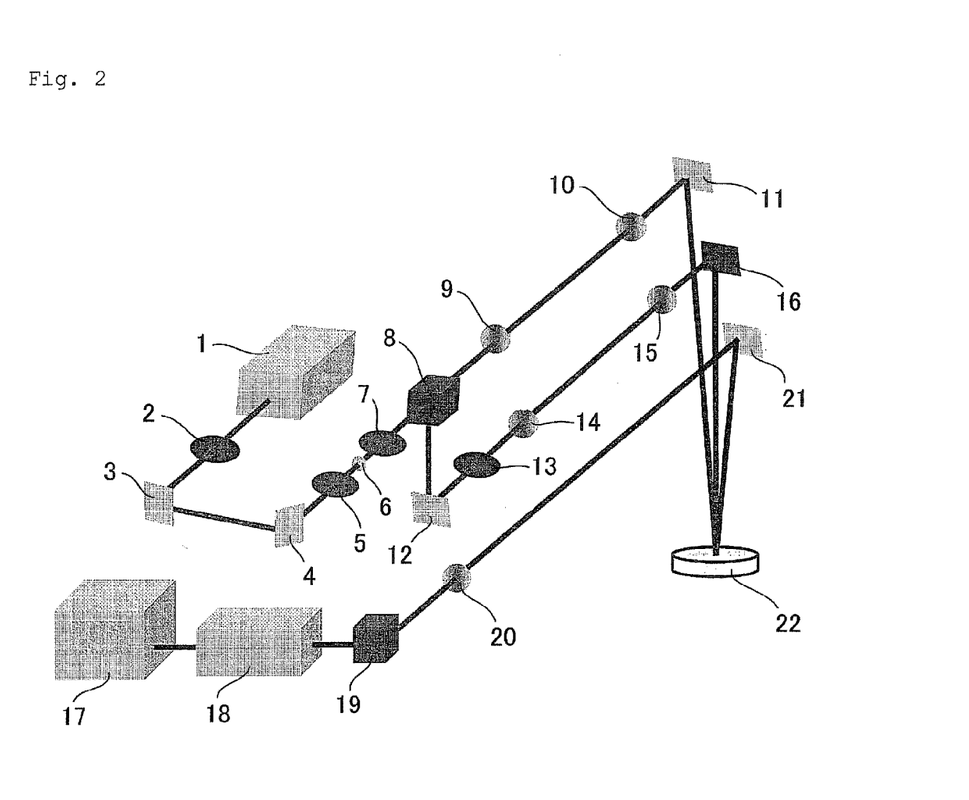
FIG. 2 is an outline view showing an apparatus for measuring the physical properties of a liquid surface.

Using the apparatus shown in FIG. 2, the sample obtained through exposing to light along the +X direction was compared with the sample obtained through exposing to light along the +Y direction in point of the difference in the physical properties therebetween, as derived from the spectral data of the samples after FFT treatment. Each sample was analyzed before and after exposing to light.

Compound 2 was used in place of Compound 1, and the samples were compared with each other in the same manner as above.

The results are shown in Table 1 below.

TABLE 1

| No. | Material Dissolved | [(Surface Tension after +X-exposure to UV) − (Surface Tension before exposure to UV)]/ [(Surface Tension after +Y-exposure to UV) − (Surface Tension before exposure to UV)] | [(Kinematic Viscosity after +X-exposure to UV) − (Kinematic Viscosity before exposure to UV)]/ [(Kinematic Viscosity after +Y-exposure to UV) − (Kinematic Viscosity before exposure to UV)] | Remarks |
|---|---|---|---|---|
| 1 | Compound 1 | −0.1< and <0.1 | −0.1< and <0.1 | Comparative Example |
| 2 | Compound 2 | −2.6 | −1.5 | Example of the Invention |

(Evaluation Method 2)

Figure 3:
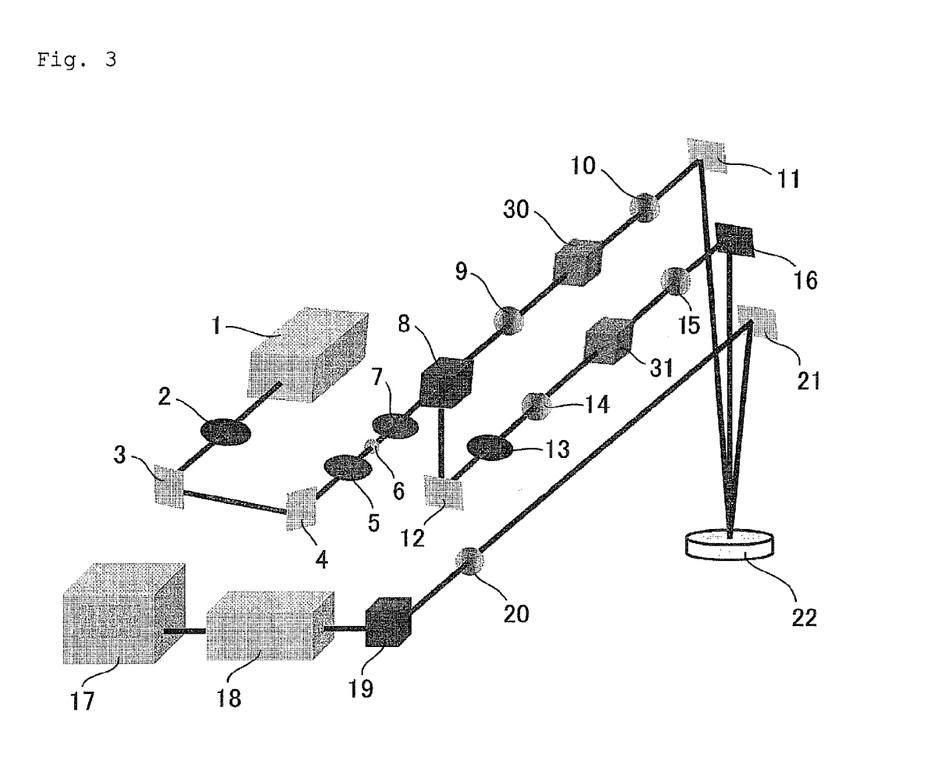
FIG. 3 is an outline view showing another apparatus for measuring the physical properties of a liquid surface.

In the same manner as in the above-mentioned Evaluation Method 1, a 2-butanone solution of Compound 1 and a 2-butanone solution of Compound 3 were prepared, and exposed to light. Briefly, in the same manner as in Evaluation Method 1, the samples were exposed to light along the +X direction, and the Stokes and anti-Stokes caused by differences in the wave directions (the +X direction and the −X direction) were compared with each other. In this test, used was the apparatus shown in FIG. 3. Briefly, acousto-optic modulators (AOM, Isomet's 1205-1054) 30 and 31 were inserted into the optical device of FIG. 2, thereby constructing a frequency shifter for use herein. Each sample was analyzed before and after the exposure to light.

The results are shown in Table 2 below.

TABLE 2

| No. | Material Dissolved | [(Surface Tension computed from Stokes after +X-exposure to UV) − (Surface Tension before exposure to UV)]/ [(Surface Tension computed from anti-Stokes after +X-exposure to UV) − (Surface Tension before exposure to UV)] | [(Kinematic Viscosity computed from Stokes after +X-exposure to UV) − (Kinematic Viscosity before exposure to UV)]/ [(Kinematic Viscosity computed from anti-Stokes after +X-exposure to UV) − (Kinematic Viscosity before exposure to UV)] | Remarks |
|---|---|---|---|---|
| 11 | Compound 1 | −0.1< and <0.1 | −0.1< and <0.1 | Comparative Example |
| 12 | Compound 3 | −2.3 | −2.4 | Example of the Invention |

As is obvious from the results in Tables 1 and 2, it has been confirmed that, in case where a substituted aromatic azo compound meeting the requirements of the invention is used, the compound is selectively adsorbed by the liquid surface and therefore the liquid surface expresses anisotropy.

When the anisotropic liquid surface-forming agent of the invention is mixed with a liquid and when the mixture liquid is exposed to an anisotropic light, then the liquid surface can express anisotropy according to such a simplified method. According to the invention, a liquid surface may be made to efficiently express anisotropy while it is in a liquid state, and therefore an extremely high-function film can be produced. To that effect, the industrial applicability of the invention is great.

The present disclosure relates to the subject matter contained in Japanese Patent Application No. 129956/2008 filed on May 16, 2008, which is expressly incorporated herein by reference in its entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A method for forming an anisotropic liquid surface in a liquid film, comprising:
   mixing a liquid with an anisotropic liquid surface-forming agent comprising a substituted aromatic azo compound to form a mixture, and
   exposing the surface of the mixture to an anisotropic light to form an anisotropic liquid surface which expresses anisotropy while in a liquid state.

2. The method for forming an anisotropic liquid surface according to claim 1, wherein the mixture comprises insoluble components in an amount of less than 50% by mass.

3. The method for forming an anisotropic liquid surface according to claim 1, wherein the surface of the mixture contains no solid at the beginning of the irradiation.

4. The method for forming an anisotropic liquid surface according to claim 1, wherein the anisotropic light has a wavelength of from 350 to 400 nm.

5. The method for forming an anisotropic liquid surface according to claim 1, wherein the surface of the mixture is exposed to the anisotropic light at a specific angle.

6. A method for forming an anisotropic surface in a liquid film comprising:
   mixing a liquid with an anisotropic liquid surface-forming agent comprising a substituted aromatic azo compound to form a liquid mixture,
   exposing the surface of the liquid mixture to an anisotropic light to form an anisotropic liquid surface which expresses anisotropy while in a liquid state, and
   thereafter drying the anisotropic liquid surface.

7. The method for forming an anisotropic surface according to claim 6, wherein the liquid mixture comprises insoluble components in an amount of less than 50% by mass.

8. A method for forming an anisotropic surface in a liquid film, comprising:
   mixing a liquid with an anisotropic liquid surface-forming agent comprising a substituted aromatic azo compound to form a liquid mixture,
   exposing the surface of the liquid mixture to an anisotropic light to form an anisotropic liquid surface which expresses anisotropy while in a liquid state, and
   thereafter polymerizing the anisotropic liquid surface.

9. The method for forming an anisotropic surface according to claim 8, wherein the liquid mixture comprises insoluble components in an amount of less than 50% by mass.

* * * * *